(12) United States Patent
Maryanski et al.

(10) Patent No.: US 11,285,820 B2
(45) Date of Patent: Mar. 29, 2022

(54) BATTERY TRAY ASSEMBLY FOR A VEHICLE

(71) Applicant: Dura Operating, LLC, Auburn Hills, MI (US)

(72) Inventors: Nolan Robert Maryanski, Rochester, MI (US); Anand Amrit, Auburn Hills, MI (US); Suhant Ranga, Novi, MI (US)

(73) Assignee: DUS OPERATING INC., Auburn Hills, MI (US)

( * ) Notice: Subject to any disclaimer, the term of this patent is extended or adjusted under 35 U.S.C. 154(b) by 76 days.

(21) Appl. No.: 16/189,249

(22) Filed: Nov. 13, 2018

(65) Prior Publication Data

US 2020/0148065 A1    May 14, 2020

(51) Int. Cl.
| | |
|---|---|
| *H01M 50/116* | (2021.01) |
| *H01M 50/131* | (2021.01) |
| *H01M 50/20* | (2021.01) |
| *B60L 50/64* | (2019.01) |
| *B60L 50/60* | (2019.01) |

(52) U.S. Cl.
CPC .............. *B60L 50/64* (2019.02); *B60L 50/66* (2019.02); *H01M 50/116* (2021.01); *H01M 50/20* (2021.01); *H01M 50/131* (2021.01)

(58) Field of Classification Search
CPC ........ H01M 2/02; H01M 2/10; H01M 50/116; H01M 50/131; H01M 50/20; B60L 50/64; B60L 50/66
See application file for complete search history.

(56) References Cited

U.S. PATENT DOCUMENTS

| | | | | |
|---|---|---|---|---|
| 2009/0325049 | A1* | 12/2009 | Niedzwiecki | ....... H01M 2/0245 429/100 |
| 2012/0169089 | A1* | 7/2012 | Rawlinson | ......... B62D 25/2027 296/193.08 |
| 2014/0014428 | A1* | 1/2014 | Yanagi | ................ H01M 2/1038 180/68.5 |
| 2015/0061307 | A1* | 3/2015 | Nakanishi | ................. F16F 7/12 293/133 |
| 2017/0149023 | A1 | 5/2017 | Baik et al. | |
| 2018/0229593 | A1* | 8/2018 | Hitz | ...................... B60L 3/0007 |

\* cited by examiner

*Primary Examiner* — James Lee
(74) *Attorney, Agent, or Firm* — Vivacqua Crane PLLC

(57) ABSTRACT

A battery tray for a vehicle includes a tub having a base, a first side wall connected to the base, and a second side wall connected to the base and disposed opposite the first side wall. The tub includes a first portion with a first strength, the first portion extending from the first side wall through the base to the second side wall, and a second portion with a second strength, the second portion extending from the first side wall through the base to the second side wall. The second strength is greater than the first strength. The first portion is welded to the second portion prior to forming the tub.

15 Claims, 3 Drawing Sheets

BATTERY TRAY ASSEMBLY FOR A VEHICLE

FIELD

The present disclosure relates generally to a battery tray assembly in a battery powered vehicle, and more particularly to a battery tray assembly optimized for torsion, rigidity, and side impact strength.

BACKGROUND

The statements in this section merely provide background information related to the present disclosure and may or may not constitute prior art.

Motor vehicles, including electric and hybrid vehicles providing at least partial propulsion from battery power, create unique conditions that must be considered due to the energy and fluid in the battery cells. For example, battery tray assemblies, which house the battery cells, include energy absorbing structures used to absorb structural impact in order to minimize battery cell damage. The battery trays of known battery powered and hybrid or battery-engine powered vehicles, hereinafter collectively referred to as "battery powered" vehicles, provide features to absorb impact loads from below and from the sides of the battery trays to minimize damage to the battery cells inside. However, the structural designs of such battery trays often require total replacement of the battery tray following minor structural damage and add significant cost to the battery tray to accommodate impact loading.

Thus, while current battery powered vehicle tray designs achieve their intended purpose, there is a need for a new and improved system and method to absorb battery tray energy loading while reducing mass.

SUMMARY

According to several aspects, a battery tray for a vehicle includes a tub having a base, a first side wall connected to the base, and a second side wall connected to the base and disposed opposite the first side wall. The tub includes a first portion with a first strength, the first portion extending from the first side wall through the base to the second side wall, and a second portion with a second strength, the second portion extending from the first side wall through the base to the second side wall. The second strength is greater than the first strength. The first portion is welded to the second portion prior to forming the tub.

In one aspect, the first portion is adjacent the second portion.

In another aspect, a front wall is connected to the base, wherein the first portion includes the front wall.

In another aspect, the tub further includes a third portion, a fourth portion, and a fifth portion each extending from the first side wall through the base to the second side wall, and wherein the first portion, the third portion, and the fifth portion each have the first strength and the second portion and the fourth portion each have the second strength.

In another aspect, a rear wall is connected to the base, wherein the third portion is adjacent the second portion, the fourth portion is adjacent the third portion, and the fifth portion is adjacent the fourth portion and includes the rear wall.

In another aspect, the first portion has a first thickness and the second portion has a second thickness, wherein the second thickness is greater than the first thickness.

In another aspect, the second thickness is about 20% to about 30% thicker than the first thickness.

In another aspect, the first thickness is about 1.0 mm and the second thickness is about 1.2 mm.

In another aspect, the first portion is made from a first type of material and the second portion is made from a second type of material, wherein the first type of material is different from the second type of material.

In another aspect, the first portion and the second portion have substantially the same thickness.

In another aspect, a cross member is connected to the base and extends from the first side wall to the second side wall.

In another aspect, the cross member is disposed on the second portion.

In another aspect, the base has a substantially flat bottom surface.

In another aspect, the first portion includes the first side wall and the second side wall, and the second portion includes the first side wall and the second side wall.

According to several other aspects, a battery tray assembly for a vehicle includes a tub having: a base, a front wall connected to the base, a rear wall connected to the base and disposed opposite the front wall, a first side wall connected to the base, and a second side wall connected to the base and disposed opposite the first side wall. The tub includes alternating first portions and second portions, the first portions having a strength less than the second portions, the first portions and second portions extending from the first side wall through the base to the second side wall, and the first portions are tailor welded to the second portions prior to forming of the tub. The battery tray assembly further includes a first side rail assembly connected to the first side wall of the tub and a second side rail assembly connected to the second side wall of the tub.

In one aspect, cross members are disposed on the second portions, the cross members extending from the first side wall to the second side wall.

In another aspect, the front wall is oriented towards a front of the vehicle and the rear wall is oriented towards a rear of the vehicle, and the first side wall connects the front wall and the rear wall, and the second side wall connects the front wall and the rear wall.

In another aspect, the base has a substantially flat bottom surface.

In another aspect, the first portions are thicker than the second portions.

In another aspect, the first portions are made of a first type of material, the second portions are made of a second type of material, wherein the first type of material has a lower strength than the second type of material.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
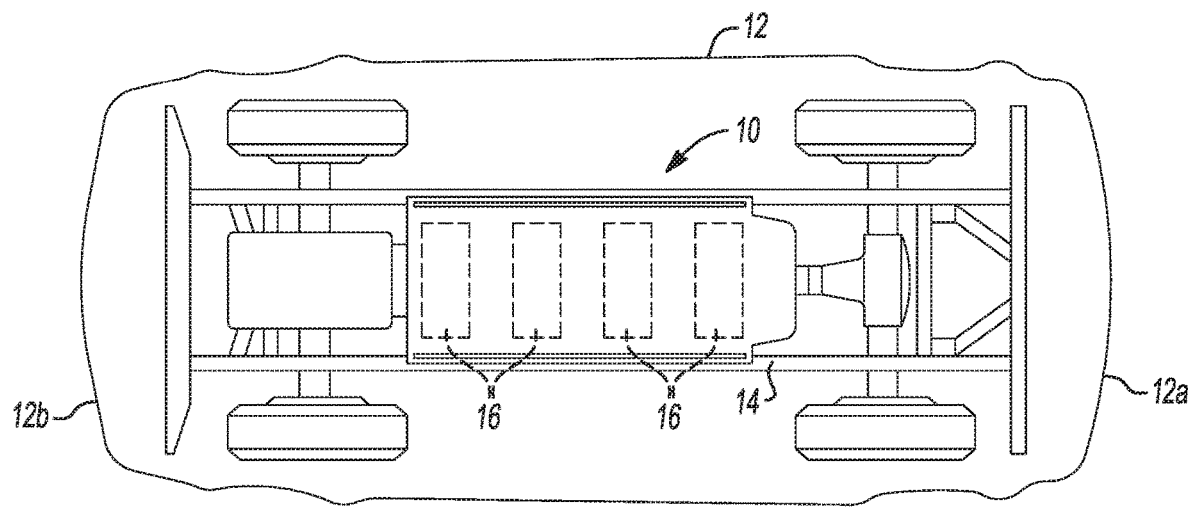
FIG. 1 is a bottom plan view of battery powered vehicle having a battery tray assembly according to an exemplary embodiment.

Referring to FIG. 1, a battery tray assembly is generally indicated by reference number 10. The battery tray assembly 10 is shown with an exemplary battery powered vehicle 12. While the battery powered vehicle 12 is illustrated as a passenger car, it should be appreciated that the battery powered vehicle 12 may be a truck, SUV, bus, or any other type of vehicle. The battery tray assembly 10 is mounted to a frame 14 of the battery powered vehicle 12. The battery tray assembly 10 is configured to house at least one and according to several aspects multiple individual battery cells 16 which provide an electrical charge as the sole power to propel the vehicle 12, or may provide supplemental power in addition to an engine (not shown).

Figure 2:
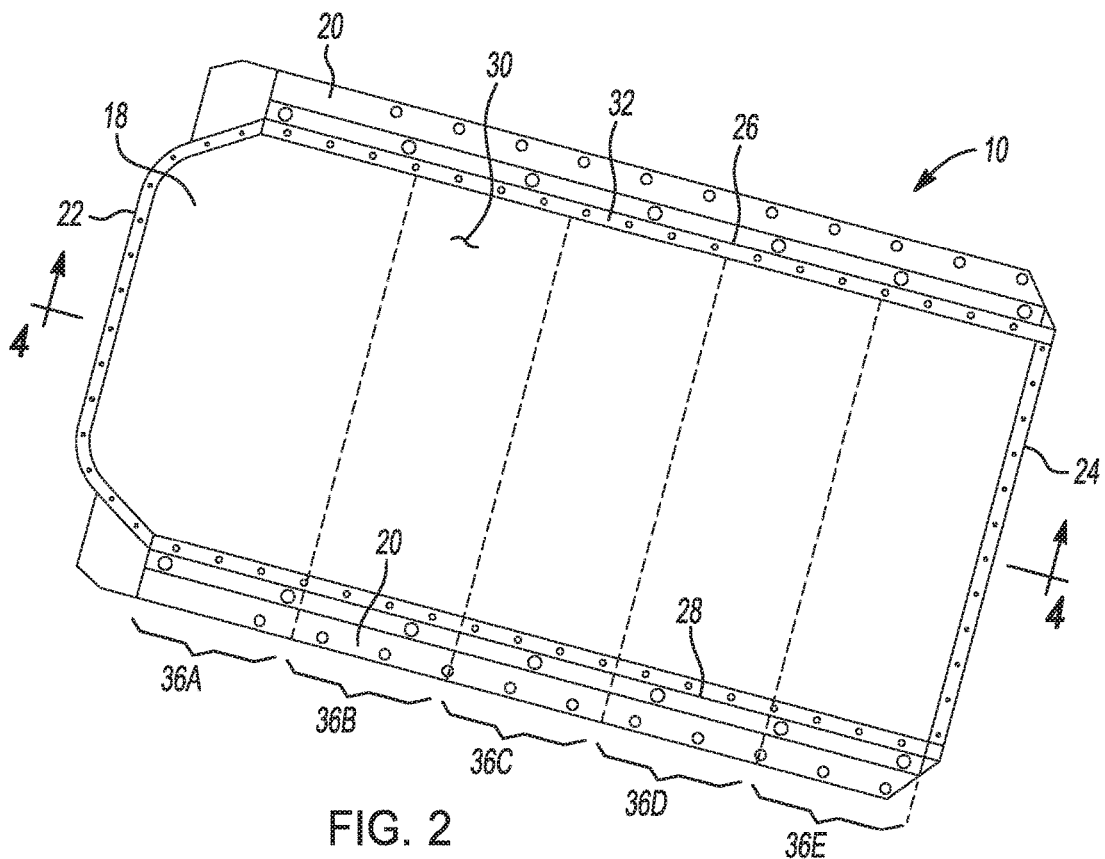
FIG. 2 is a top plan view of the battery tray assembly of FIG. 1.
Figure 3:
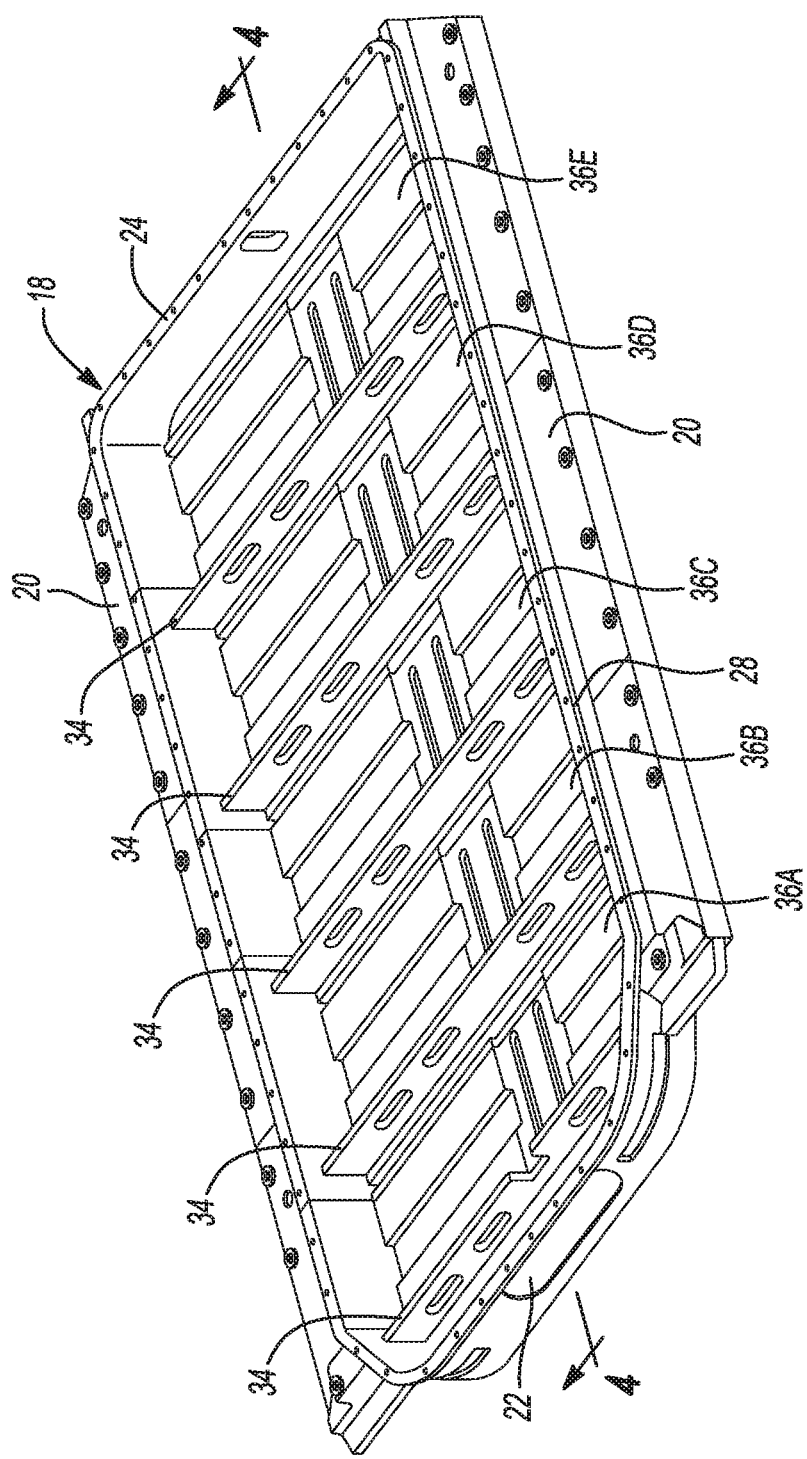
FIG. 3 is a top perspective view of the battery tray assembly of FIG. 2.

Referring to FIGS. 2 and 3, the battery tray assembly 10 generally includes a tub 18 and a pair of side rail assemblies 20. The tub 18 is preferably formed as a monolithic unitary structure, such as by stamping or drawing from a metal sheet to form the entire tub 18, or roll formed. The tub 18 includes a front wall 22, a rear wall 24, a first side wall 26, and a second side wall 28 all connected to a base 30. The front wall 22 is disposed opposite the rear wall 24 while the first side wall 26 is disposed opposite the second side wall 28. In some embodiments, the tub 18 does not include the front wall 22 and the rear wall 24. As shown in FIG. 1, the front wall 22 is oriented towards a front 12b of the vehicle 12 while the rear wall 24 is oriented towards a rear 12a of the vehicle 12. The first side wall 26 connects the front wall 22 and the rear wall 24 and the second side wall 28 connects the front wall 22 and the rear wall 24. The front wall 22, the rear wall 24, the first side wall 26, and the second side wall 28 are each substantially perpendicular to the base 30. As used herein, the term "substantially" is known by those skilled in the art. Alternatively, the term "substantially" means +/−10 degrees. Thus, the tub 18 is configured to hold and surround the battery cells 16, providing protection especially from the sides, front, rear, and bottom. The tub 18 includes an upper flange 32 that extends outwardly from an upper end of the tub 18. A cover (not shown) is connected to the upper flange 22.

The side rail assemblies 20 are connected to the first side wall 26 and the second side wall 28. The side rail assemblies 20 extend along an entire length of the side walls 26, 28 to provide an energy absorbing side impact structure for the battery tray assembly 10. In some embodiments, the side rail assemblies 20 are substantially identical.

The battery tray assembly 10 further includes cross-members 34 disposed within and connected to the tub 18. In the example provided, the battery tray assembly 10 includes five cross-members 34, though it should be appreciated that any number of cross-members 34 may be employed. The cross-members 34 provide rigidity to the tub 18. The cross-members 34 extend between and are connected to the first side wall 26, the second side wall 28, and the base 30.

Figure 4:
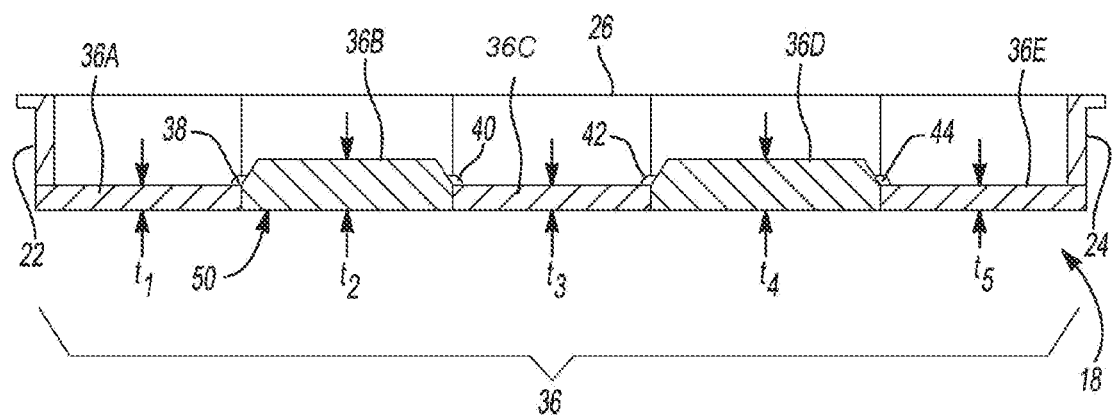
FIG. 4 is a cross-section view of a tailor welded blank used in forming the battery tray assembly viewed in the direction of arrows 4-4 in FIGS. 2 and 3.

Turning to FIG. 4, the tub 18 is formed from a tailor welded blank. The tub 18 may be roll-formed from the tailor welded blank or formed by bending or drawing of the tailor welded blank. The tailor welded blank includes a number of portions 36 welded together, each portion 36 optionally having a different material thickness or material grade. In the example provided the tub 18 includes five portions 36 including a first portion 36A, a second portion 36B, a third portion 36C, a fourth portion 36D, and a fifth portion 36E. In one embodiment, the number of portions 36 is determined by bending and torsion analysis. Each of the portions 36 extend laterally relative to the tub 18 and parallel to one another. Thus, each portion extends from the first side wall 26 through the base 30 to the second side wall 28. When the battery tray assembly 10 is attached to the vehicle 12, portions 36 are preferably oriented to extend laterally in the vehicle, or said another way side to side in the vehicle. The lateral orientation of the portions 36 relative to the vehicle improves the side impact strength of the battery tray assembly 10. In one embodiment, the portions 36 extend to include the first side wall 26 and the second side wall 28. Thus, the first side wall 26, the second side wall 28, and the base 30 are formed from the tailor welded blank that includes the portions 36. In another embodiment, the front wall 22 is also formed from the tailor welded blank and is comprised of the first portion 36A. In yet another embodiment, the rear wall 24 is also formed from the tailor welded blank and is comprised of the fifth portion 36E. However, it should be appreciated that the front wall 22 and the rear wall 24 may be separate components attachable to the base 30 and not formed from the tailor welded blank.

The first portion 36A is welded to the second portion 36B by welds 38. The second portion 36B is welded to the third portion 36C by welds 40. The third portion 36C is welded to the fourth portion 36D by welds 42. The fourth portion 36D is welded to the fifth portion 36E by welds 44. The welds 38, 40, 42, and 44 may be created by MIG or laser welding.

As noted above, the portions 36 may have variable strength via variable material thickness or material grade. In the example provided, the first portion 36A has a first strength, the second portion 36B has a second strength, the third portion 36C has a third strength, the fourth portion 36D has a fourth strength, and the fifth portion 36E has a fifth strength. In one embodiment that optimizes bending and torsion strength of the tub 18, the second and fourth strengths are each greater than each of the first, third, and the fifth strengths. In another embodiment, the second and fourth strengths are equal. In yet another embodiment, the first, third, and fifth strengths are equal.

Figure 5:
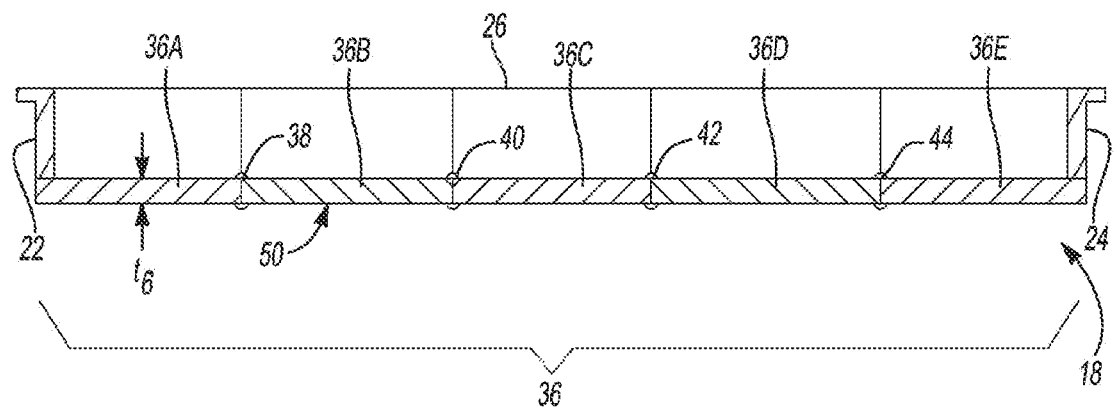
FIG. 5 a cross-section view of another example of a tailor welded blank used in forming the battery tray assembly.

The strength of the portions 36 is customized by modifying a thickness of the portions 36, as shown in FIG. 4, and/or by selecting different materials for the portions 36, as shown in FIG. 5. For example, in one embodiment shown in FIG. 4, the portions 36 are comprised of the same material but the first portion has a cross-section thickness "t1", the second portion 36B has a cross-section thickness "t2", the third portion 36C has a cross-section thickness "t3", the fourth portion has a cross-section thickness "t4", and the fifth portion 36E has a cross-section thickness "t5". In a preferred embodiment, t2 and t4 are each greater than each of t1, t3, and t5. Thus, the second portion 36B and the fourth portion 36D are thicker, and consequently have greater strength, than the first portion 36A, the third portion 36C, and the fifth portion 36E. Increasing the thicknesses t2 and t4 increases axial, shear, torsional and bending strength of the second portion 36B and the fourth portion 36D, respectively. In one aspect of the present disclosure, the second thickness t2 is equal to the fourth thickness t4. In another aspect of the present disclosure, the first thickness t1 is equal to the third thickness t3 and the fifth thickness t5. In another aspect, the second thickness t2 and the fourth thickness t4 are each about 20% to about 30% thicker than the first thickness t1, the third thickness t3, and the fifth thickness t5. The term "about" as used herein is known to those skilled in the art. Alternatively, the term "about" means +/−5%. In another aspect, the second thickness t2 and the fourth thickness t4 are each about 1.0 mm to about 1.2 mm, and the first thickness t1, the third thickness t3, and the fifth thickness t5 are each about 0.5 mm to about 1.0 mm. The term "about" as used herein is known to those skilled in the art. Alternatively, the term "about" means +/−0.3 mm. The increased thicknesses of the tub 18 are preferably disposed within the tub 18 such that the base 30 has a substantially planar, flat bottom surface 50. The term "substantially" as used herein is known by those skilled in the art and includes surfaces that have indentations, extensions, and other features but that is on average planar and flat.

In the alternate embodiment shown in FIG. 5, the portions 36 each have the same thickness "t6" but are made of different materials. For example, the second portion 36B and the fourth portion 36D are each comprised of Grade 70 steel while the first portion 36A, the third portion 36C, and the fifth portion 36E are each comprised of Grade 50 steel. Changing the material grade of the steel modifies the yield and ultimate stress or stiffness of the portions 36 and thus their strength. In other examples, the portions 36 are comprised of multiple grades of aluminum, such as 5000 series and 6000 series, friction-stir welded together or a steel aluminum combination, such as 6000 series welded to EDDS steel, so long as the third portion 64 has a greater strength.

In both embodiments shown in FIGS. 4 and 5, the cross-members 34 are preferably disposed on and attached, such as by welding or adhesive, to the strengthened portions. As shown in FIG. 3, the cross-members 34 are disposed on the edges of the strengthened portions, particularly the edges of second portion 36B and the edges of the fourth portion 36D. However, the cross-members 34 may be disposed inward from the edges of the strengthened portions and still provide improved torsion, rigidity, and side impact strength of the battery tray 10. Further, the strengthened sections, particular second portion 36B and fourth portion 36D, are laterally oriented with respect to the vehicle 12 when the battery tray assembly 12 is installed on the vehicle to improve the side-impact strength of the battery tray assembly.

In the embodiment shown in FIG. 4, tub 18 has a flat bottom surface 50. The flat bottom surface 50 is formed by aligning the outer surface of the portions 36 during assembly of the tailor welded blank, prior to forming of the tub 18. As shown in FIG. 4, sections with increased thickness, such as portion 36A and portion 36B have the thickened portion directed inward to the tub to maintain the flat bottom surface 50.

The battery tray assembly of the present disclosure offers several advantages. These include the incorporation of energy absorbing structures in an efficient space envelope. In addition, these energy absorbing structures are formed from tailor welded blanks that reduce mass while maximizing side impact energy absorption to protect the battery cells within the battery tray assembly.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A battery tray for a vehicle comprising:
   a tailor welded blank forming a tub, the tub having:
   a base;
   a first side wall connected to the base;
   a second side wall connected to the base and disposed opposite the first side wall;
   a plurality of laterally extending portions, wherein each laterally extending portion of the plurality of laterally extending portions extends between the first side wall to the second side wall, the plurality of laterally extending portions including at least a first laterally extending portion having a first strength and a second laterally extending portion having a second strength;
   at least one cross-member extending between the first side wall to the second side wall and disposed over an edge of the second laterally extending portion;
   a front wall connected to the base, wherein the first laterally extending portion includes the front wall; and
   a third laterally extending portion, a fourth laterally extending portion, and a fifth laterally extending portion each extending from the first side wall within the base to the second side wall, and wherein the first laterally extending portion, the third laterally extending portion, and the fifth laterally extending portion each have the first strength and the second laterally extending portion and the fourth laterally extending portion each have the second strength,
   wherein the second strength is greater than the first strength, and
   wherein the first laterally extending portion is welded to the second laterally extending portion and the first laterally extending portion is adjacent the second laterally extending portion.

2. The battery tray of claim 1, further comprising:
   a rear wall connected to the base, wherein the third laterally extending portion is adjacent the second laterally extending portion, the fourth laterally extending portion is adjacent the third laterally extending portion, and the fifth laterally extending portion is adjacent the fourth laterally extending portion and includes the rear wall.

3. The battery tray of claim 1, wherein the first laterally extending portion has a first thickness and the second laterally extending portion has a second thickness, wherein the second thickness is greater than the first thickness.

4. The battery tray of claim 3, wherein the second thickness is about 20% to about 30% thicker than the first thickness.

5. The battery tray of claim 3, wherein the first thickness is about 1.0 mm and the second thickness is about 1.2 mm.

6. The battery tray of claim 1, wherein the first laterally extending portion is made from a first type of material and the second laterally extending portion is made from a second type of material, wherein the first type of material is different from the second type of material.

7. The battery tray of claim 1, wherein the cross member is disposed on the second laterally extending portion.

8. The battery tray of claim 1, wherein the base has a substantially flat bottom surface.

9. The battery tray of claim 1, wherein the first laterally extending portion includes the first side wall and the second side wall, and the second laterally extending portion includes the first side wall and the second side wall.

10. The battery tray of claim 1, further comprising a vehicle battery disposed within the base.

11. A battery tray assembly for a vehicle comprising:
a tailor welded blank forming a tub, the tub having:
a base;
a front wall connected to the base;
a rear wall connected to the base and disposed opposite the front wall;
a first side wall connected to the base; and
a second side wall connected to the base and disposed opposite the first side wall,
a plurality of alternating laterally extending portions, wherein each alternating laterally extending portion of the plurality of alternating laterally extending portions extends between the first side wall to the second side wall, the plurality of alternating laterally extending portions including at least a first laterally extending portion having a first strength and a second laterally extending portion having a second strength less than the first strength, wherein the first laterally extending portion is welded to the second laterally extending portion;
at least one cross-member extending between the first side wall to the second side wall and disposed over an edge of the second laterally extending portion
a first side rail assembly connected to the first side wall of the tub; and
a second side rail assembly connected to the second side wall of the tub.

12. The battery tray assembly of claim 11, wherein the front wall is oriented towards a front of the vehicle and the rear wall is oriented towards a rear of the vehicle, and the first side wall connects the front wall and the rear wall, and the second side wall connects the front wall and the rear wall.

13. The battery tray assembly of claim 11, wherein the base has a substantially flat bottom surface.

14. The battery tray assembly of claim 11, wherein the first laterally extending portion is thicker than the second laterally extending portion.

15. The battery tray assembly of claim 11, wherein the first laterally extending portion is made of a first type of material, the second laterally extending portion is made of a second type of material, wherein the first type of material has a lower strength than the second type of material.

* * * * *